T. G. ORWIG.
Barbed Fence Wire.

No. 201,890. Patented April 2, 1878.

Witnesses:
P. C. Kenyon,
Festus J. Stone,

Inventor:
Thomas G. Orwig

UNITED STATES PATENT OFFICE.

THOMAS G. ORWIG, OF DES MOINES, IOWA, ASSIGNOR OF THREE-FOURTHS OF HIS RIGHT TO ALBERT SNOOK, OF OSWEGO, ILLINOIS.

IMPROVEMENT IN BARBED FENCE-WIRES.

Specification forming part of Letters Patent No. 201,890, dated April 2, 1878; application filed August 20, 1877.

*To all whom it may concern:*

Be it known that I, THOMAS G. ORWIG, of Des Moines, Iowa, have invented an Improved Barbed Fence-Wire, of which the following is a specification:

The object of my invention is to provide a fence-wire that is adapted to receive and retain barbs at intervals, in such a manner that each barb can revolve on the wire, and also have restricted lateral play, to prevent it from tearing the flesh of animals, as frequently occurs in the use of rigidly-fixed barbs.

It consists in forming two double bends or crimps at intervals in a continuous wire, to serve as shoulders or bearings on each side of each barb, to restrict the lateral sliding movement of a rotary barb, as hereinafter fully set forth.

Figure 1 of my drawing is a perspective view of a section of my improved fence-wire.

$a$ represents a continuous wire, which may vary in size, as desired. $b\ b$ are short double bends or crimps, formed by means of crimping dies or rollers, through which the wire is passed in finishing it. This is preferably done at the same time the wire is made and the iron hot; but it may be successfully accomplished by passing a straight and cold wire through the crimping-machine. These crimps $b$, formed in pairs at intervals of six or twelve inches apart, or at any distance at which it may be desired to place barbs, may be close together, so as to limit the lateral play and sliding motion of a rotating barb placed between them to half an inch, or an inch and a half, as may be desired, and as may be required to suit the various barb forming and fixing machines and implements in use.

Figure 1:
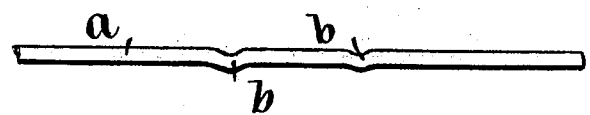
Figure 2:
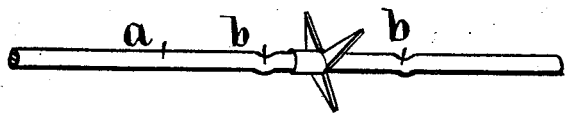
Fig. 2 is a perspective view of a section of my improved wire, having a sheet-metal rotating three-pointed barb combined therewith.
Figure 3:
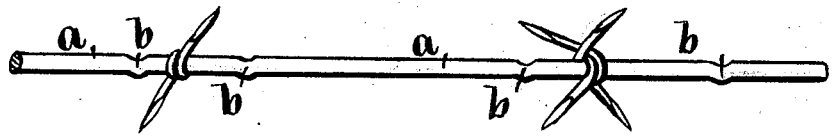
Fig. 3 represents a section of wire having a two-pointed and also a four-pointed wire barb placed between the contiguous crimps $b\ b$, as contemplated.

Various forms of barbs may be thus combined with my improved fence-wire in such a manner that they will act like a rotating spur when an animal comes in contact therewith.

I am aware that wires have been paneled by forming single bends at intervals to restrict a barbed rotating spool from sliding on the wire.

I am also aware that barbs of various forms have been placed on fence-wires in such a manner as to allow them rotary motion, and also a lateral or sliding motion; but there was no provision for restricting the sliding motion, and hence the barbs not rigidly fixed would slide together, and the barbed fence became defective as a means of restraining animals.

By means of my pairs of double bends or crimps $b\ b$, each barb placed on my improved wire will have a restricted lateral or sliding motion, and consequently the series of barbs will be retained in proper positions relative to each other, as required, to fully accomplish the results contemplated in making barbed-wire fences.

The cost of adding my improvement to a straight wire will be nominal, and the points for fixing barbs will be indicated, and the bends $b$ will also aid materially in preventing the wire from breaking by contraction caused by frost, as frequently occurs in the use of straight wire.

I am aware that sheet-metal barbs having a tubular and central base have been rigidly fixed to a fence-wire by crimping or swaging the base of the barb and the fence-wire together. A single crimp for each barb has thus been formed in fence-wires. But I claim that my manner of forming twin crimps or double bends $b\ b$ in a fence-wire, to restrict the sliding of a barb placed between the two distinct crimps, is novel and greatly advantageous.

I claim as my invention—

1. A fence-wire having twin crimps or pairs of crimps $b\ b$ at intervals to mark the location for barbs, and to restrict the sliding of barbs placed between the distinct crimps, substantially as shown and described.

2. As an improved article of manufacture, a fence-wire having crimps $b\ b$ and barbs placed on the wire between said crimps, to rotate and slide upon the wire, in the manner and for the purposes set forth.

THOMAS G. ORWIG.

Witnesses:
R. G. ORWIG,
ARTHUR STIMSON.